Sept. 6, 1927.　　　　P. C. DIMBERG　　　　1,641,745

METHOD OF UNITING BLADES

Filed April 17, 1924

Inventor
P. C. Dimberg
by
Attorney

Patented Sept. 6, 1927.

1,641,745

UNITED STATES PATENT OFFICE.

PAUL C. DIMBERG, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

METHOD OF UNITING BLADES.

Application filed April 17, 1924. Serial No. 707,059.

This invention relates in general to improvements in the art of manufacturing turbine structures and relates more specifically to an improved method of assembling and uniting turbine blades.

An object of the invention is to provide an improved method of uniting turbine blade elements with one or more connecting elements.

It has heretofore been commercial practice to assemble and unite a plurality of radiating turbine blades by means of one or more strips of metal which were soldered or brazed to the blades. Ordinarily one of the connecting strips is secured to the adjacent ends of the blades and forms a shroud. When the blades are relatively long, one or more bracing or lacing strips are provided in addition to the shroud, these lacing strips coacting with the corresponding edges of the blades intermediate their ends. The prior practice of soldering these strips to the blades, consisted of clamping or otherwise holding the strips in position relatively to the assembled blades, heating the strip and blades at the place of coaction, and applying silver solder in strip form to the heated portions of the elements to produce a union by fusion of metal. While the individuals employed to thus solder the elements, become relatively skilled in this particular art, it is impossible even with the greatest care, to prevent considerable waste of solder by virtue of the fact that the solder tends to flow along the surfaces of the blades and of the connecting strips, away from the joints. When applying a relatively thin bracing or lacing strip by this old method, the waste of solder is more pronounced than when the relatively massive shroud strip is applied. The solder frequently forms lumps and other unevenness upon the working surfaces of the blades, thereby interfering with most efficient operation of the blading. Another objection to the prior method is that the coacting elements are united only along the corners and not along the surfaces of coaction.

The present invention contemplates provision of an improved method whereby turbine blading may be effectively united by soldering, with the aid of a minimum amount of solder. With the improved method, waste of solder is reduced to a minimum and application of the solder is facilitated. The improved method moreover eliminates formation of lumps or unevenness upon the working surfaces of the blades at the joints, thereby maintaining maximum efficiency of the united blading. With the improved method, soldering is effected along the entire surfaces of coaction between the elements thus insuring more rigid union of the elements. These and other objects and advantages of the present improvement will be apparent in the course of the following decription.

A clear conception of the several steps of the improved method will be had by referring to the drawing accompanying and forming a part of this specification, in which like reference characters designate the same or similar parts in the several views.

The turbine blading to the manufacture of which the present improved method is especially applicable, is ordinarily formed in segments each comprising a plurality of radiating blades 2 having a foundation segment 5 rigidly attached to the root ends thereof and having a shroud strip 3 of channel shaped cross section attached to and uniting the opposite ends thereof. When the blades 2 are of relatively great length, they are additionally united intermediate their ends with one or more bracing or lacing strips 4.

Figure 1:
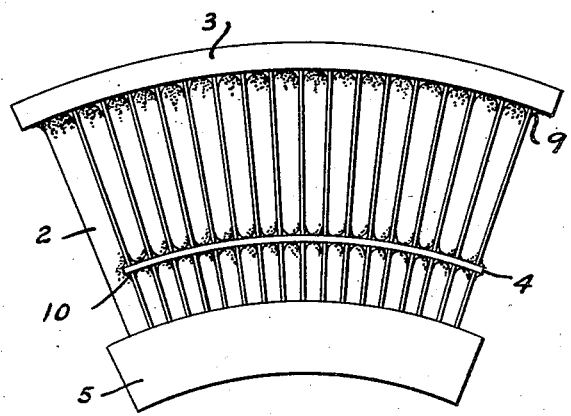
Fig. 1 is a plan view of a turbine blade segment constructed in accordance with the prior art, the segment being completely assembled but not finally finished.
Figure 2:
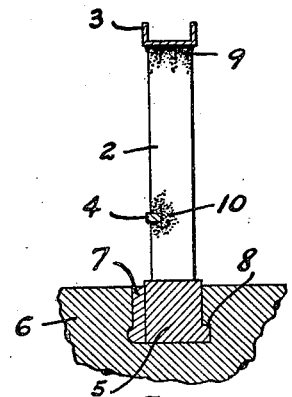
Fig. 2 is a section through a turbine blade segment showing the same completely finished and applied to a supporting element, the blading of this figure likewise having been constructed in accordance with the prior art.
Figure 3:
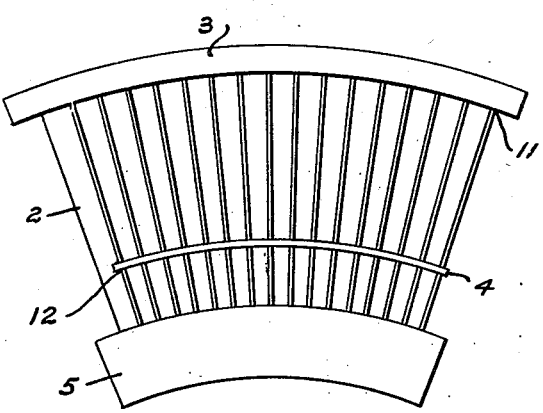
Fig. 3 is a plan view of a turbine blade segment constructed in accordance with the present improvement, showing the segment prior to final finishing thereof.
Figure 4:
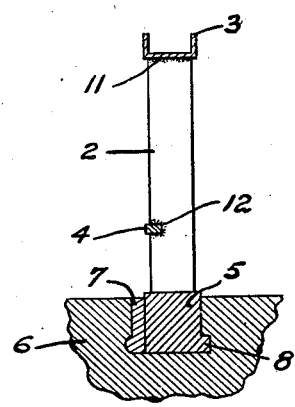
Fig. 4 is a section through a turbine blade segment constructed in accordance with the present improved method, the segment having been finished and applied to a support.

When utilizing the prior method of assembling these segments, the blades 2 are first assembled in a spacing and angling jig and a shroud segment strip 3 is clamped against the end surfaces of the blades 2. With a shroud strip 3 thus held in position, the elements are ready for brazing. The brazing is accomplished by heating the adjacent portions of the coacting elements to a cherry red heat and by applying silver solder in strip form to the heated coacting portions of the elements after a suitable flux has been applied. The silver solder flows around the corners formed by the coacting portions of the elements and produces a fillet of soldering material 9 around each joint. The lacing strips 4 after being applied in notches in the blades 2 are likewise soldered to the blades by heating the coacting elements and applying flux and solder 10, as indicated in Figs. 1 and 2. After the segments have been united by applying the strips 3, 4 and by subsequently applying foundation segments 5, they are finished as shown in Fig. 2 and applied to the final supporting element 6. With the segments thus finished and mounted, they are held against outward displacement relatively to the support 6 by means of a tongue 8 and a calking strip 7.

In accordance with the improved method of applying the shroud strips 3 and the bracing or lacing strips 4, the connecting strips are first coated either locally or completely, with solder. The coated shroud strip 3 is then temporarily positioned relatively to the blades 2 with the aid of a spacing and angling jig, in the same manner as in the prior art. After a shroud strip 3 has been clamped against the ends of a plurality of properly spaced and angled blades 2, the shroud 3 and the adjacent ends of the blades 2 are uniformly heated to cause the coating of solder to fuse with the metal along the entire blade ends and to permanently unite the segment 3 with the blades 2. In applying a lacing strip 4 in accordance with the improved method, the lacing strip is likewise first coated with solder after which it is applied in the notches previously provided in the blade edges. The lacing strip and the adjacent portions of the blading are then uniformly heated to produce a union by fusion of the solder with the coacting elements. By thus coating the strips 3, 4 the fillets of material 11, 12 formed at the joints, are confined to the joints and no soldering material is permitted to flow for any great distance along the blading. As the solder is located between and along the entire surfaces of coaction, the elements are effectively united all along these surfaces. The finishing of the segments formed in accordance with the improved method is accomplished in a manner similar to that of the prior art and the final segments are supported in like manner.

It will be obvious that with the improved method waste of solder is substantially eliminated and more uniform unions are obtainable. The coatings may be made of any thickness which will insure joints of sufficient strength, and it may in some instances be desirable to utilize solder having relatively high fusion point, in order to insure proper heating of the adjacent elements before the solder melts. The human element of applying a uniform quantity of solder at all joints is entirely eliminated by providing a uniform initial coating of solder which insures soldering along the entire surfaces of coaction. It may in some cases be desirable to dip the ends or other portions of the blades 2 located adjacent to the final joints, in solder, either in substitution of coating the strips, or in addition thereto, and the strips 3, 4 may obviously be either entirely or only partially coated.

It should be understood that it is not desired to limit the invention to the exact steps of the method herein described, for various modifications within the scope of the claims may occur to persons skilled in the art.

It is claimed and desired to secure by Letters Patent:

1. The method of uniting a group of blades having fluid conducting passages therebetween, which comprises, definitely positioning the individual blades closely adjacent to each other to provide relatively narrow spaces between the successive blades, coating a connecting strip with only sufficient solder to produce local unions along the strip at spots spaced apart equal to the distance between the successive blades, placing the solder coated strip in contact with the positioned blades adjacent to said passages, and heating the elements to cause the solder coating to flow between and to permanently unite said blades and said strip at the contact surfaces.

2. The method of uniting a group of blades having fluid conducting passages therebetween, which comprises, definitely positioning the individual blades closely adjacent to each other to provide relatively narrow spaces between the successive blades, notching the blade edges adjacent to said passages, coating a connecting strip with only sufficient solder to produce local unions along the strip at spots spaced apart equal to the distance between the successive notches in the blades, placing the solder coated strip within said notches and adjacent to said passages, and heating the elements to cause the solder coating to flow between and to permanently unite said blades and said strip within said notches.

In testimony whereof, the signature of the inventor is affixed hereto.

PAUL C. DIMBERG.